United States Patent Office 2,863,714
Patented Dec. 9, 1958

2,863,714

PYRROCOLINE DYES FOR POLYESTER MATERIALS

Robert S. Long and Richard J. Boyle, Bound Brook, N. J., assignors to American Cyanamid Company, New York, N. Y., a corporation of Maine No Drawing. Original application June 2, 1955, Serial No. 512,888. Divided and this application August 22, 1956, Serial No. 605,485

16 Claims. (Cl. 8—55)

This invention relates to the process of dyeing synthetic fibers with compounds of the formula:

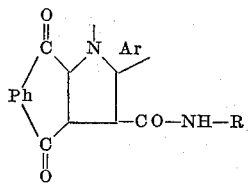

where Ph is a 1,2-phenylene or substituted 1,2-phenylene radical; R is an aromatic radical and Ar is a fused aromatic ring system of less than three rings in which the nitrogen shown is the only hetero-atom, and more specifically, to the process of dyeing polyesters fibers therewith, and to the fibers thus dyed.

Compounds of this type are referred to as aromatic amides of 2,3-phthaloylpyrrocoline-1-carboxylic acids. They may also be referred to as naphtho (2,3-b) pyrrocoline-6,11-dione derivatives. However, for convenience, the phthaloylpyrrocoline designation is used in this specification. Examples of such products are the anilides, anisides, xylides, etc. of 2,3-phthaloylpyrrocoline-1-carboxylic acid, 2,3-(5-nitrophthaloyl)-pyrrocoline-1-carboxylic acid, 2,3-phthaloylbenzo(5,6)pyrrocoline-1-carboxylic acid and variously substituted products thereof.

The introduction of synthetic fibers as commercial products has resulted in many new problems in the field of dyes. Many dyes useful for coloring various natural fibers such as cotton, wool, and silk, are not suitable for many synthetic fibers, examples of which are superpolyesters such as "Dacron", and acetate rayon. With the introduction of each new synthetic fiber, a new problem has arisen and it has been necessary to seek new dyes and dyeing procedures for each of the new fibers. With most of the new synthetic fibers it has been quite difficult to find new dyes affording a variety of shades of color with the necessary fastness properties. Although many new dyes have been developed, few possess the properties necessary for success, that is, sufficient substantivity combined with purity and brightness of shade, ease of application, fastness to light, wash fastness, etc. It has been especially difficult to solve this problem for fibers such as the polyester fibers, particularly Dacron.

We have now found that the arylides of 2,3-phthaloylpyrrocoline-1-carboxylic acids are excellent disperse dyes for the polyester and cellulose acetate fibers, showing at the same time a surprisingly high degree of light fastness and wash fastness. It is most unexpected that these amides should be such excellent dyes for these synthetic fibers. The corresponding acid and esters, the unsubstituted amides and even the aliphatic amides, are completely unsatisfactory and commercially useless as dyes for synthetic fibers and do not show the desirable properties of the aromatic amides.

Previously, 2,3-phthaloylpyrrocoline-1-carboxylic acid, its unsubstituted amide and its esters had been prepared (Pratt, Luckenbaugh, and Erickson, Journal of Organic Chemistry, 19, 176–182—1954). However, these compounds are not useful as dyes and because of their undesirable properties there could be no indication that by replacing the ester or unsubstituted amide groups with an aromatic amide group, such excellent dyes could be obtained. According to the present invention, synthetic fibers such as the superpolyesters, and the acetate rayons can be readily dyed with the aromatic amides of 2,3-phthaloylpyrrocoline-1-carboxylic acid. Especially valuable is the dyeing of superpolyester fibers (e. g. polyglycolterephthalate, hereinafter referred to as Dacron) which have been particularly difficult to dye in the past.

By varying the substituent on the amide group, a variety of shades may be obtained. The dyes used in the present invention have excellent properties and show desirable shades and fastness, substituted anilides being especially desirable from the standpoint of shade, tinctorial strength and fastness. An especially surprising property is their striking fastness to light, all the more unexpected since the corresponding phthaloylpyrrocoline and the 1-carboxylic ester, while they do have some affinity for fibers, are so sensitive to light that they are completely useless and actually are extremely fugitive. Fading in light takes place at such a rapid rate that the light fastness ratings of the esters and the unsubstituted amide are of the lowest order.

A convenient method for the preparation of the dyes to be used in our invention involves the use, as a starting material, of the acid chlorides of 2,3-phthaloylpyrrocoline-1-carboxylic acids. These chlorides may be prepared by the method of Pratt et al. The arylides are obtained by reaction of the acid chloride with various aromatic amines. In this way a large variety of arylides is produced. Examples of aromatic amines which are useful are aniline and derivatives such as dichloroanilines, nitroanilines, anisidines, xylidines, chloroanilines, dimethoxyanilines, p-aminoacetanilide, toluidines, carbalkoxyanilines, and the like, etc.; amines of the biphenyl series such as 2- and 4-biphenylamines, etc.; aromatic amines of the naphthalene series such as alpha-naphthylamine, beta-naphthylamine, etc.; aromatic amines of the heterocyclic series such as alpha-, beta- and gamma-aminopyridine, 2-amino pyrimidine, etc., and the like. The presence of lower alkoxy and alkyl groups in the aromatic amine is particularly advantageous; in general, these substituted anilides have more attractive shades and appreciably greater tinctorial strength.

Compounds for use in our invention, containing substituents in the benzo ring of the pyrrocoline derivative may furthermore be produced by using a substituted 2,3-dichloro-1,4-naphthoquinone in the reaction with pyridine and acetoacetic ester. Substituents which are particularly useful and which are readily introduced are halogen, nitro, acylamine and dialkylamino. Other substituents such as alkyl, alkoxy, cyano, carbalkoxy, may also be used, but these are more difficult to introduce into the naphthoquinone nucleus. One of the most useful starting materials for compounds of this type is 5-nitro-2,3-dichloronaphthoquinone, which reacts as indicated below:

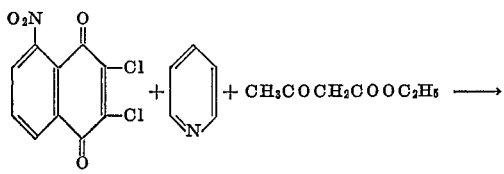

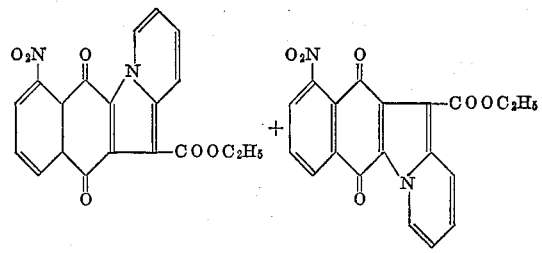

The isomeric mixture can be used as is or the isomers can be separated. The nitro group can then be reduced and acylated or alkylated or it can be diazotized and replaced by a variety of groups in the usual manner. By starting with a 5-nitro-8-acylamino-2,3-dichloronaptho-quinone instead of the above nitro compound, there are prepared the corresponding nitro amino compounds, from which diamino compounds are prepared. Particularly deep shades of high tinctorial strength may be obtained from such diamines.

The esters of the substituted phthaloylpyrrocoline carboxylic acids formed by this first step, are then converted to the arylides by conversion through the carboxylic acid to the acid chloride and reaction with the desired aromatic amine.

By the use of a substituted pyridine such as a picoline in this type of preparation with a 2,3-dichloro-1,4-naphthoquinone, which may or may not be further substituted, and acetoacetic ester, compounds are obtained containing a similarly substituted pyridine nucleus in the pyrrocoline structure. Other heterocycles such as quinoline, phenyl pyridine and isoquinoline may also be used instead of pyridines. This results in compounds which contain an additional ring fused to the pyridine nucleus in the pyrrocoline structure. The esters thus obtained are converted to the pyrrocoline-1-carboxylic aromatic amide in the same way as above.

For the preparation of the aromatic amides, the acid chloride of the 2,3-phthaloylpyrrocoline-1-carboxylic acid is heated with the aromatic amine in an organic solvent; o-dichlorobenzene is an example of an especially useful solvent for this purpose. On cooling, the reaction product is isolated by ordinary means. An alternative method is to react the acid directly with the amine according to known procedures using a compound such as phosphorus trichloride as condensing agent.

In applying the dyes to the fibers to achieve the dyeings of our invention, the dye is first pasted with a small amount of dispersing agent and the paste is diluted with a large amount of water to make the dyebath. The synthetic fiber to be dyed is then immersed in the bath and the mixture is held at the boil until the dyeing is complete, usually about one hour.

As dispersing agents for this procedure, one can use agents such as sodium N-methyl-N-oleoyltaurate, ether alcohol sulfates, long chain alcohol sulfates, alkyl aryl sulfonates, tetrasodium pyrophosphate, or sodium lignin sulfonates.

In addition to the above ingredients, it is usually desirable to include in the dyebath a dyeing assistant, although this is not necessary. Especially preferable are oil in water emulsions of esters of aromatic carboxylic acids such as are described and claimed in the copending application of Mecco, Carlino, and Zimmerman, Serial No. 437,558, filed June 17, 1954. With the aid of such dyeing assistants it is possible to attain the maximum strength dyeings on Dacron fibers.

This application is a division of our copending application, Serial No. 512,888, filed June 2, 1955, and now abandoned.

The invention may be further illustrated by the following examples:

EXAMPLE 1

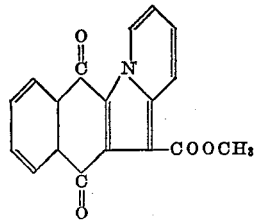

A mixture of 100 parts of methyl acetoacetate, 123 parts of pyridine, 80 parts of anhydrous alcohol and 40 parts of 2,3-dichloro-1,4-naphthoquinone is heated to the reflux temperature, with stirring, until the reaction is substantially complete. After cooling, the precipitated solid is collected by filtration and washed thoroughly with ethanol; the product which is obtained is purified by recrystallization from glacial acetic acid.

EXAMPLE 2

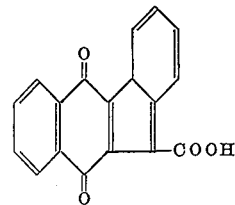

To 120 parts of ethanol is added 12 parts of 1-carbomethoxy-2,3-phthaloylpyrrocolines. The mixture is stirred and heated, and to the hot slurry is slowly added 20 parts of 5 N sodium hydroxide solution. After stirring at the reflux temperature for a short time, the solid sodium salt which precipitates is isolated by filtration. This is stirred with boiling acetic acid and the product which precipitates on cooling is collected, washed thoroughly with water, and dried.

EXAMPLE 3

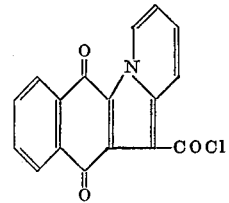

A mixture of 61.2 parts of 2,3-phthaloylpyrrocoline-1-carboxylic acid and 640 parts of thionyl chloride is stirred at the reflux temperature until the reaction is substantially complete. After cooling, the solid material is removed by filtration and washed thoroughly with light petroleum ether. After drying the acid chloride is obtained as an orange solid.

EXAMPLE 4

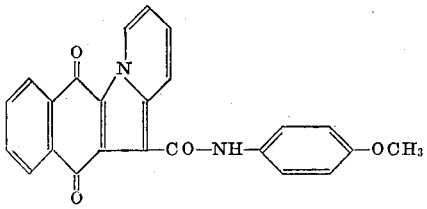

A mixture of 7.74 parts of 2,3-phthaloylpyrrocoline-carbonyl chloride, 6.16 parts of p-anisidine and 130 parts of o-dichlorobenzene is stirred at the reflux temperature until the reaction is substantially complete. After cooling, the precipitated solid is removed by filtration, washed thoroughly with alcohol, then with hot water and finally again with alcohol. After drying the product is obtained as a deep violet colored solid. It may be purified by recrystallization from o-dichlorobenzene.

By using equivalent quantities of the following amines in the above process, the corresponding arylamides are obtained:

| No. | Amine | Color |
| --- | --- | --- |
| 1 | Alpha-naphthylamine | Deep red solid. |
| 2 | o-chloroaniline | Red solid. |
| 3 | 2,5-dimethoxyaniline | Maroon solid. |
| 4 | p-animoacetanilide | Deep violet solid. |
| 5 | aniline | Do. |
| 6 | o-anisidine | Maroon solid. |
| 7 | m-xylidine | Do. |
| 8 | p-nitroaniline | Do. |
| 9 | 2-amino-biphenyl | Bright maroon solid. |
| 10 | 2-aminopyridine | Dull red solid. |
| 11 | 2-aminothiazole | Dull maroon solid. |
| 12 | 2-aminopyrimidine | Red solid. |
| 13 | 4-aminobiphenyl | Maroon solid. |
| 14 | 2,4,6-trichloroaniline | Bright maroon solid. |
| 15 | anthranilic acid | Orange-red solid. |
| 16 | p-aminophenol | Reddish-brown solid. |
| 17 | o-nitroaniline | Red solid. |
| 18 | 4-nitro-2-methoxyaniline | Do. |
| 19 | cresidine | Maroon solid. |
| 20 | m-aminobenzotrifluoride | Do. |
| 21 | p-aminobenzoic acid | Red solid. |
| 22 | m-toluidine | Deep maroon solid. |
| 23 | methyl anthranilate | Red solid. |
| 24 | 2,4-dimethoxyaniline | Deep maroon solid. |

EXAMPLE 5

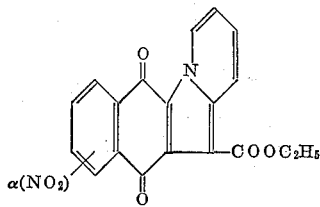

A mixture of 100 parts of ethyl acetoacetate, 123 parts of pyridine, 80 parts of anhydrous alcohol and 48 parts of 5-nitro-2,3-dichloro-1,4-naphthoquinone is heated to the reflux temperature with stirring, until the reaction is substantially complete. After cooling, the precipitated solid is collected by filtration and washed thoroughly with ethanol; the product which is obtained may be purified by recrystallization from an organic solvent.

EXAMPLE 6

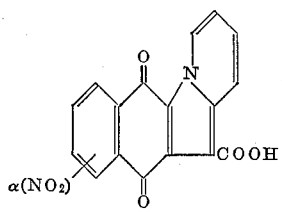

To 120 parts of ethanol is added 13.8 parts of 1-carbomethoxy-2,3-(3[6]-nitrophthaloyl)pyrrocoline. The mixture is stirred and heated, and to the hot slurry is slowly added 20 parts of 5 N sodium hydroxide solution. After stirring at the reflux temperature for a short time, the solid sodium salt which precipitates is isolated by filtration. This is stirred with boiling acetic acid and the product which precipitates on cooling is collected, washed thoroughly with water, and dried.

EXAMPLE 7

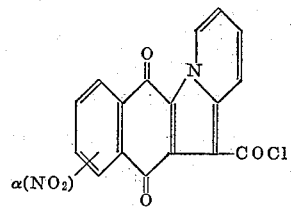

A mixture of 71 parts of 2,3-(3[6]-nitrophthaloyl)-pyrrocoline-1-carboxylic acid and 640 parts of thionyl chloride is stirred at the reflux temperature until the reaction is substantially complete. Afttr cooling, the solid material is removed by filtration and washed thoroughly with light petroleum ether. After drying the acid chloride is obtained as an orange solid.

EXAMPLE 8

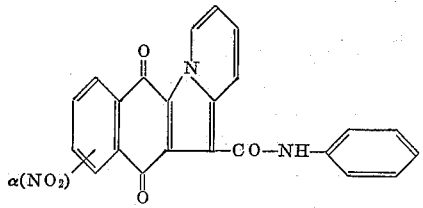

A mixture of 8.8 parts of 2,3-(3[6]-nitrophthaloyl)-pyrrocoline-1-carbonyl chloride, 4.65 parts of aniline and 130 parts of o-dichlorobenzene is stirred at the reflux temperature until the reaction is substantially complete. The mixture is cooled, the precipitated product is collected, washed with alcohol and hot water and finally again with alcohol. The dried product is a red solid.

Similarly, by using an equivalent amount of a 5-nitro-8-acylamido-2,3-dichloronaphthoquinone, the corresponding nitro-acylamino pyrrocoline compound is prepared.

By using equivalent quantities of p-anisidine, p-nitroaniline, o-toluidine and alpha-naphthylamine the corresponding arylamides are prepared.

EXAMPLE 9

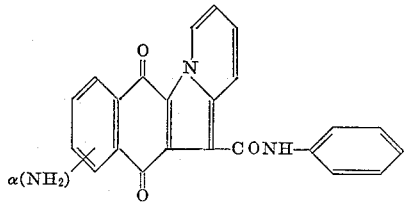

A clarified mixture of 100 parts of water, 8.75 parts of 50% sodium hydroxide and 11.8 parts of 40% sodium hydrosulfide is heated and stirred while a slurry of 25 parts of the product of Example 8 in 30 parts of water is added gradually. The amino compound is isolated by filtration and washing. The nitro acylamino compounds mentioned in Example 8 can be similarly reduced, followed by deacylation to form the corresponding diamine.

EXAMPLE 10

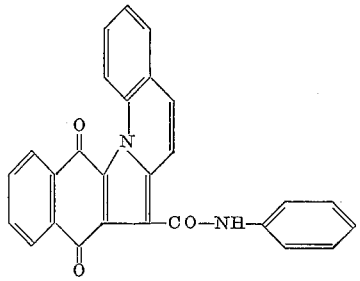

The procedure of Examples 2-4 is followed except that an equivalent quantity of the ester prepared by Pratt and coworkers is used instead of the product of Example 1. The ester is saponified as in Example 2, converted to the acid chloride as in Example 3, and this in turn reacted with aniline as in Example 4.

EXAMPLE 11

*Dyeing procedure on Dacron*

A 5 part sample of the anilide of 2,3-phthaloylpyrrocoline-1-carboxylic acid is pasted with a small amount of a 10% solution of a dispersing agent such as sodium N-methyl-N-oleoyltaurate. A dye bath is prepared from this by dilution to 20,000 parts with water. To this is added 50 parts of a 10% ammonium acetate solution. A 500 part skein of "Dacron" (polyglycolterephthalate) is introduced into the dye bath and dyed at the boil for one hour. The skein is removed, rinsed, and dried. The "Dacron" is dyed a lavender shade.

In a similar manner the various substituted anilides described in Example 4 can be applied to "Dacron." In general, the dyeings are somewhat weaker than when applied with the aid of a dyeing assistant as in Example 14.

The same shade is obtainable if fibers of cellulose acetate are used instead of the "Dacron."

EXAMPLE 12

*Dyeing procedure on Dacron with assistant*

A 5 part sample of the o-anisidide of 2,3-phthaloylpyrrocoline-1-carboxylic acid is pasted with a small amount of a 10% solution of a dispersing agent such as sodium N-methyl-L-oleoyltaurate. A dye bath is prepared from this by dilution to 20,000 parts with water. To this is added 720 ports of a 25% methyl salicylate emulsion. A 500 part skein of "Dacron" is introduced into the dye bath and dyed at the boil for one hour. The skein is removed, rinsed, and dried. The Dacron is dyed a strong bluish-red color.

By this process "Dacron" is dyed with other substituted amides of 2,3-phthaloylpyrrocoline-1-carboxylic acid as follows:

| N-Substituent | Shade |
|---|---|
| Phenyl | Bluish-red. |
| m-Xylyl | Bluish-pink. |
| Alpha naphthyl | Dull pink. |
| 4-Methoxyphenyl | Medium violet. |
| 2-Chlorophenyl | Pink. |
| 2,5-Dimethoxyphenyl | Reddish-violet. |
| p-Acetylaminophenyl | Medium lavender. |
| 2-Thiazolyl | Bluish-pink. |
| 2-Biphenylyl | Medium pink. |
| 2-Pyridyl | Pink. |
| 2-Pyrimidyl | Yellowish-pink. |
| 2-Methoxy-4-methylphenyl | Bluish-pink. |
| 3-Trifluoromethylphenyl | Do. |
| m-Tolyl | Do. |
| 2,4,6-Trichlorophenyl | Medium red. |
| 4-Biphenylyl | Bluish-pink. |
| 2-Carbomethoxyphenyl | Yellowish-pink. |

EXAMPLE 13

Dacron is dyed by the procedure of Example 12 with the following compounds. The fastness to light of the resultant dyeings is determined by the AATCC Fadeometer Test with the tabulated results:

| Dye | Shade | Fastness |
|---|---|---|
| 2,3-phthaloylpyrrocoline-1-carboxylic acid ethyl ester | Yellow | 1-2 |
| 2,3-phthaloylpyrrocoline-1-carboxylic acid methyl ester | do | 1-2 |
| 2,3-phthaloylpyrrocoline-1-carboxamide | Scarlet | 1-2 |
| 1-Acetyl-2,3-phthaloylpyrrocoline | Orange | 1 |
| 2,3-phthaloylpyrrocoline-1-carbox-o-aniside | Bluish-red | 6-7 |
| 2,3-phthaloylpyrrocoline-1-carbox-p-aniside | Violet | 6 |

We claim:

1. Fibers selected from the group consisting of superpolyesters and cellulose esters dyed with amides derived from acids of the structure:

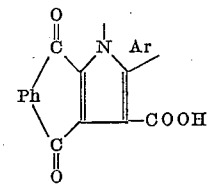

in which Ph is a six-membered mononuclear carbocylic aromatic ring, and Ar is a fused aromatic ring system of less than three six-membered rings in which the nitrogen atom shown is the only hetero-atom; and a primary aromatic amine of less than three rings, the dye molecule being free from water solubilizing groups.

2. The dyed fibers of claim 1 in which the fibers are superpolyester fibers.

3. The dyed fibers of claim 2 in which the fibers are polyglycolterephthalate fibers.

4. The dyed fibers of claim 3 in which the dye is an aromatic amide of 2,3-phthaloylpyrrocoline-1-carboxylic acid.

5. The dyed fibers of claim 3 in which the dye is an amide of an acid of the structure:

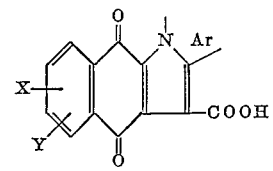

in which at least one of X and Y are chosen from the group consisting of nitro, amino, and substituted amino and Ar is a fused aromatic ring system of less than three six-membered rings in which the nitrogen atom shown is the only heteroatom, and a primary aromatic amine of less than three rings, the dye molecule being free from water solubilizing groups.

6. The dyed fibers of claim 5 in which Ar is a fused six-membered ring having no additional rings fused thereto.

7. The dyed fibers of claim 3 in which the dye is a secondary aromatic amide of the acid of the structure:

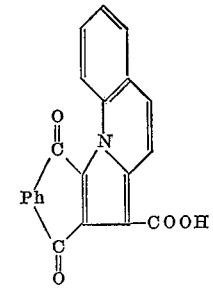

in which Ph is a six-membered mononuclear carbocyclic aromatic ring.

8. The dyed fibers of claim 4 in which the aromatic amide is the o-anisidide.

9. The dyed fibers of claim 4 in which the aromatic amide is the m-xylidide.

10. The dyed fibers of claim 4 in which the aromatic amide is the p-anisidide.

11. The dyed fibers of claim 4 in which the aromatic amide is the o-chloranilide.

12. The dyed fibers of claim 4 in which the aromatic amide is the 2,4-dimethoxyanilide.

13. The dyed fibers of claim 4 in which the aromatic amide is the 4-methyl-2-methoxyanilide.

14. The process of dyeing synthetic organic fibers selected from superpolyesters and cellulose esters with amides derived from acids of the structure:

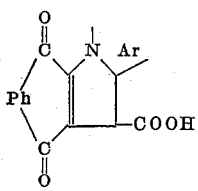

in which Ph is a six-membered mononuclear carbocyclic aromatic ring and Ar is a fused aromatic ring system of less than three six-membered rings in which the nitrogen atom shown is the only hetero-atom, and a primary aromatic amine of less than three rings, the dye molecule being free from water solubilizing groups, which comprises heating an aqueous dispersion of the dye with the synthetic organic fiber until the fiber is dyed.

15. The process of claim 14 in which the fiber is a polyglycolterephthalate fiber.

16. The process of claim 15 in which there is included in the dyebath an oil-in-water emulsion of an ester of an aromatic monocarboxylic acid as a dyeing assistant.

References Cited in the file of this patent

UNITED STATES PATENTS

| | | |
|---|---|---|
| 1,803,008 | Ellis | Apr. 28, 1931 |
| 2,080,254 | Dreyfus | May 11, 1937 |
| 2,663,612 | Gibson | Dec. 22, 1953 |
| 2,670,263 | Luttringhaus | Feb. 23, 1954 |
| 2,772,274 | Schmidt-Nickels | Nov. 27, 1956 |